United States Patent
Huang et al.

(10) Patent No.: US 12,362,803 B2
(45) Date of Patent: *Jul. 15, 2025

(54) PRECODER MATRIX QUANTIZATION FOR COMPRESSED CSI FEEDBACK

(71) Applicant: QUALCOMM Incorporated, San Diego, CA (US)

(72) Inventors: Min Huang, Beijing (CN); Chenxi Hao, Beijing (CN); Yu Zhang, San Diego, CA (US); Chao Wei, Beijing (CN); Liangming Wu, Beijing (CN); Qiaoyu Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,247

(22) Filed: Jun. 11, 2024

(65) Prior Publication Data

US 2024/0333356 A1 Oct. 3, 2024

Related U.S. Application Data

(63) Continuation of application No. 17/425,018, filed as application No. PCT/CN2020/073761 on Jan. 22, 2020, now Pat. No. 12,047,142.

(51) Int. Cl.
*H04B 7/06* (2006.01)
*H04B 7/0417* (2017.01)

(52) U.S. Cl.
CPC ......... *H04B 7/0626* (2013.01); *H04B 7/0417* (2013.01); *H04B 7/0634* (2013.01); *H04B 7/0658* (2013.01)

(58) Field of Classification Search
None
See application file for complete search history.

(56) References Cited

U.S. PATENT DOCUMENTS

| 2010/0271931 A1 | 10/2010 | Cheng et al. |
| 2011/0032839 A1 | 2/2011 | Chen et al. |

(Continued)

FOREIGN PATENT DOCUMENTS

| CN | 101400074 A | 4/2009 |
| CN | 101969363 A | 2/2011 |

(Continued)

OTHER PUBLICATIONS

Ericsson: "On CSI Enhancements for MU-MIMO Support", 3GPP TSG-RAN WG1 Meeting #94bis, R1-1811193, Oct. 12, 2018(Oct. 12, 2018), pp. 1-8, Section 2.3.

(Continued)

*Primary Examiner* — Ayman A Abaza
*Assistant Examiner* — Camquyen Thai
(74) *Attorney, Agent, or Firm* — QUALCOMM Incorporated

(57) ABSTRACT

Certain aspects of the present disclosure provide techniques for precoder matrix quantization for compressed channel state information (CSI) feedback. A method for wireless communications by a user equipment (UE) includes receiving a CSI report configuration for frequency domain compressed precoder matrix feedback. The CSI report configuration configures the UE to report, for a plurality of selected beams at a plurality of time domain taps, a frequency domain compression basis vector and a plurality of linear combination coefficients associated with the frequency domain compression. For each of the beams, the UE groups the time domain taps into at least first and second groups. The groups each can have zero, one, or more than one time domain taps. The UE quantizes the corresponding linear combination coefficients and/or frequency domain compression basis vectors based on the grouping.

20 Claims, 10 Drawing Sheets

(56) References Cited

U.S. PATENT DOCUMENTS

| | | | |
|---|---|---|---|
| 2011/0111747 | A1 | 5/2011 | Tosato |
| 2011/0310870 | A1 | 12/2011 | Van Nee et al. |
| 2014/0003304 | A1 | 1/2014 | Balachandran et al. |
| 2014/0269395 | A1 | 9/2014 | Chen et al. |
| 2015/0341101 | A1 | 11/2015 | Park et al. |
| 2016/0156401 | A1 | 6/2016 | Onggosanusi et al. |
| 2016/0365913 | A1 | 12/2016 | Lau et al. |
| 2018/0145737 | A1 | 5/2018 | Rahman et al. |
| 2018/0269941 | A1 | 9/2018 | Faxér et al. |
| 2019/0334587 | A1 | 10/2019 | Rahman et al. |
| 2020/0145071 | A1 | 5/2020 | Brown et al. |
| 2020/0228177 | A1* | 7/2020 | Mittal ............... H04B 7/0626 |
| 2021/0159960 | A1 | 5/2021 | Mittal et al. |
| 2021/0391910 | A1* | 12/2021 | Wu .................... H04B 7/0639 |
| 2021/0399781 | A1* | 12/2021 | Rupasinghe ........ H04B 7/0641 |
| 2022/0077911 | A1 | 3/2022 | Sergeev et al. |
| 2022/0085855 | A1 | 3/2022 | Huang et al. |
| 2023/0105779 | A1 | 4/2023 | Song et al. |

FOREIGN PATENT DOCUMENTS

| | | | |
|---|---|---|---|
| CN | 102088333 | A | 6/2011 |
| CN | 103944667 | A | 7/2014 |
| WO | 2015074262 | A1 | 5/2015 |
| WO | 2020098924 | A1 | 5/2020 |
| WO | 2020106981 | A1 | 5/2020 |

OTHER PUBLICATIONS

Huawei, et al., "Quantization Bit for Codebook Enhancement", 3GPP TSG RAN WG1 Meeting #95, R1-1813693, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, 4 Pages, Nov. 3, 2018, XP051480034, the whole document.

International Preliminary Report on Patentability—PCT/CN2019/072861 The International Bureau of WIPO—Geneva, Switzerland, Aug. 5, 2021.

International Preliminary Report on Patentability—PCT/CN2020/073761 The International Bureau of WIPO—Geneva, Switzerland, Aug. 5, 2021.

International Search Report and Written Opinion—PCT/CN2019/072861—ISA/EPO—Oct. 22, 2019.

International Search Report and Written Opinion—PCT/CN2020/073761—ISA/EPO—Apr. 22, 2020.

Liu Z., et al., "CSI Feedback Based on Spatial and Frequency Domains Compression for 5G Multi-User Massive MIMO Systems", 2019 IEEE/CIC International Conference on Communications in China (ICCC), Aug. 11-13, 2019, pp. 834-839.

Motorola Mobility, et al., "Considerations on Type II CSI Enhancement", 3GPP TSG RAN WG1 Ad-Hoc Meeting 1901, R1-1900943 CSI Enhancement, 3rd Generation Partnership Project, Mobile Competence Centre, 650, Route Des Lucioles, F-06921 Sophia-Antipolis Cedex, France, vol. RAN WG1, No. Taipei, Jan. 21, 2019-Jan. 25, 2019, 15 Pages, Jan. 12, 2019, XP051576478, Sections 1, 2 and 5.

Motorola Mobility et al., "Type II CSI Overhead Reduction", 3GPPTSG RAN1#95, R1-1813357 Type II Feedback Compression, 3rd Generation Partnership Project, Mobile Competence Centre, 650, Route Des Lucioles, F-06921 Sophia-Antipolis Cedex, France, vol. RAN WG1, No. Spokane, China, Nov. 12, 2018-Nov. 16, 2018, Nov. 3, 2018, XP051479673, 8 Pages.

Supplementary European Search Report—EP20744590—Search Authority—Munich—Sep. 9, 2022.

* cited by examiner $$F_l^H = \begin{bmatrix} f_0^H \\ f_1^H \\ f_2^H \\ \vdots \\ f_{N_3 O_3}^H \end{bmatrix} = \begin{bmatrix} e^{\frac{j2\pi \cdot 0 \cdot 0}{N_3 O_3}} & e^{\frac{j2\pi \cdot 0 \cdot 1}{N_3 O_3}} & \cdots & e^{\frac{j2\pi \cdot 0 \cdot (N_3-1)}{N_3 O_3 - 1}} \\ e^{\frac{j2\pi \cdot 1 \cdot 0}{N_3 O_3}} & e^{\frac{j2\pi \cdot 1 \cdot 1}{N_3 O_3}} & \cdots & e^{\frac{j2\pi \cdot 1 \cdot (N_3-1)}{N_3 O_3 - 1}} \\ e^{\frac{j2\pi \cdot 2 \cdot 0}{N_3 O_3}} & e^{\frac{j2\pi \cdot 2 \cdot 1}{N_3 O_3}} & \cdots & e^{\frac{j2\pi \cdot 2 \cdot (N_3-1)}{N_3 O_3 - 1}} \\ \vdots & \vdots & \ddots & \vdots \\ e^{\frac{j2\pi \cdot N_3 O_3 \cdot 0}{N_3 O_3}} & e^{\frac{j2\pi \cdot N_3 O_3 \cdot 1}{N_3 O_3}} & \cdots & e^{\frac{j2\pi \cdot N_3 O_3 \cdot (N_3-1)}{N_3 O_3 - 1}} \end{bmatrix}$$

FIG. 7

PRECODER MATRIX QUANTIZATION FOR COMPRESSED CSI FEEDBACK

CROSS-REFERENCE TO RELATED APPLICATION(S)

This application is a continuation of U.S. National Phase application Ser. No. 17/425,018, filed Jul. 22, 2021, which is a national stage application under 35 U.S.C. 371 of PCT/CN2020/073761, filed Jan. 22, 2020, which claims benefit of and priority to International Application No. PCT/CN2019/072861, filed Jan. 23, 2019, which are both hereby assigned to the assignee hereof and hereby expressly incorporated by reference herein in their entirety as if fully set forth below and for all applicable purposes.

BACKGROUND

Field of the Disclosure

Aspects of the present disclosure relate to wireless communications, and more particularly, to techniques for precoder matrix quantization for compressed channel state information (CSI) feedback.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving a channel state information (CSI) report configuration for frequency domain compressed precoder matrix feedback. The CSI report configuration configures the UE to report, for a plurality of selected beams at a plurality of time domain taps, a frequency domain compression basis vector and a plurality of linear combination coefficients associated with the frequency domain compression. The method generally includes, for each of the plurality of beams, grouping the time domain taps into at least first and second groups. A number of time domain taps in each group is zero, one, or greater than one. The method generally includes quantizing the corresponding linear combination coefficients and/or frequency domain compression basis vectors based on the grouping.

Certain aspects provide an apparatus for wireless communication. The method generally includes a memory and at least one processor coupled with the memory. The at least one processor is generally configured to receive a CSI report configuration for frequency domain compressed precoder matrix feedback. The CSI report configuration configures the apparatus to report, for a plurality of selected beams at a plurality of time domain taps, a frequency domain compression basis vector and a plurality of linear combination coefficients associated with the frequency domain compression. The at least one processor is generally configured to, for each of the plurality of beams, group the time domain taps into at least first and second groups. A number of time domain taps in each group is zero, one, or greater than one. The at least one processor is generally configured to quantize the corresponding linear combination coefficients and/or frequency domain compression basis vectors based on the grouping.

Certain aspects provide an apparatus for wireless communication. The apparatus generally includes means for receiving a CSI report configuration for frequency domain compressed precoder matrix feedback. The CSI report configuration configures the apparatus to report, for a plurality of selected beams at a plurality of time domain taps, a frequency domain compression basis vector and a plurality of linear combination coefficients associated with the frequency domain compression. The apparatus generally includes means for, for each of the plurality of beams, grouping the time domain taps into at least first and second groups. A number of time domain taps in each group is zero, one, or greater than one. The apparatus generally includes means for quantizing the corresponding linear combination coefficients and/or frequency domain compression basis vectors based on the grouping.

Certain aspects provide a computer readable medium storing computer executable code thereon for wireless communication. The computer readable medium generally includes code for receiving a CSI report configuration for frequency domain compressed precoder matrix feedback. The CSI report configuration configures a UE to report, for a plurality of selected beams at a plurality of time domain taps, a frequency domain compression basis vector and a plurality of linear combination coefficients associated with the frequency domain compression. The computer readable medium generally includes code for, for each of the plurality of beams, grouping the time domain taps into at least first and second groups. A number of time domain taps in each group is zero, one, or greater than one. The computer readable medium generally includes code for quantizing the corresponding linear combination coefficients and/or frequency domain compression basis vectors based on the grouping.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 is an example frequency domain compression matrix for CSI reporting, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
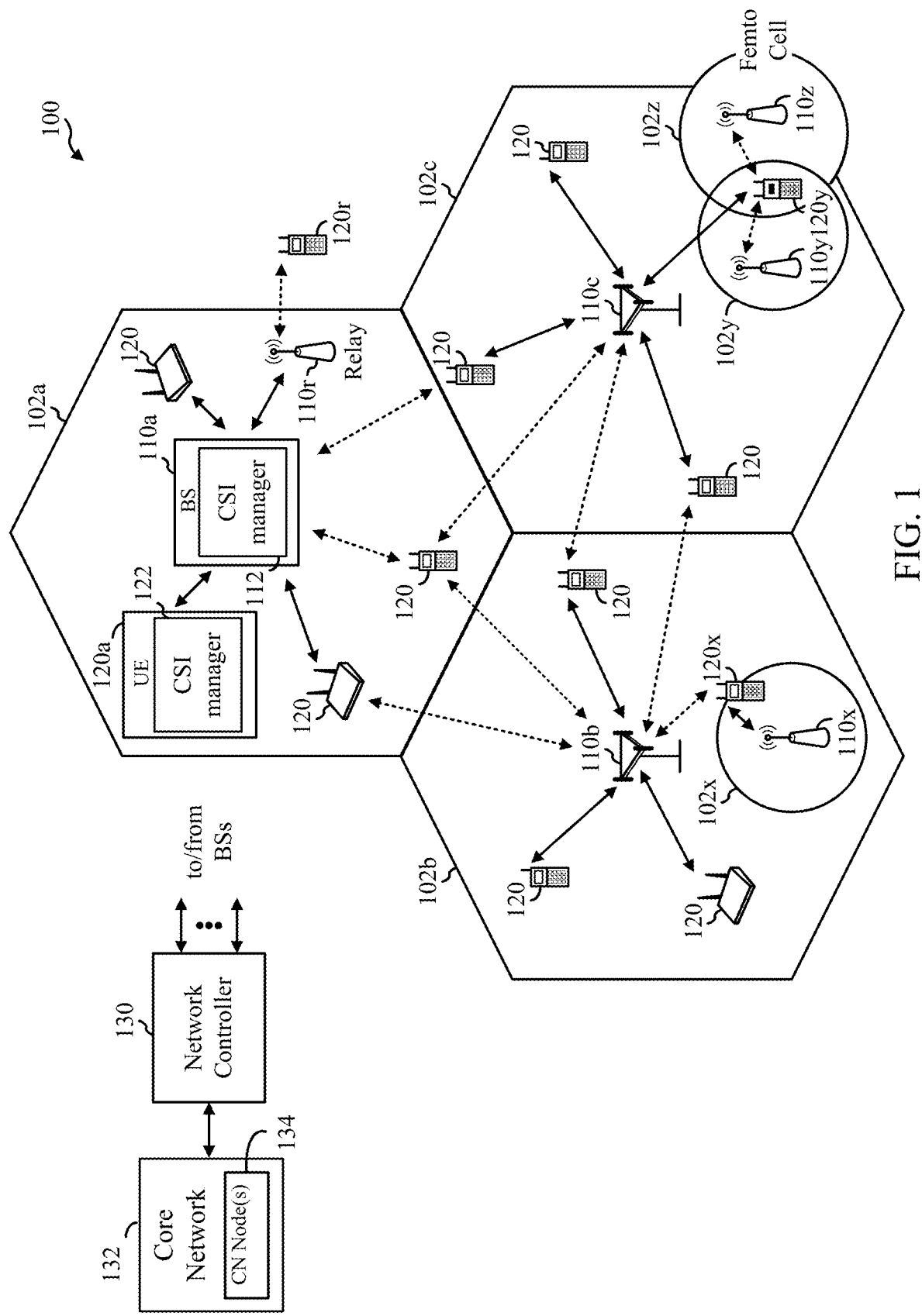
FIG. 1 is a block diagram conceptually illustrating an example telecommunications system, in accordance with certain aspects of the present disclosure.

Aspects of the present disclosure provide apparatus, methods, processing systems, and computer readable mediums for precoder matrix quantization for compressed channel state information (CSI) feedback.

The following description provides examples of precoder matrix quantization for compressed CSI feedback, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. For clarity, while aspects may be described herein using terminology commonly associated with 3G, 4G, and/or 5G wireless technologies, aspects of the present disclosure can be applied in other generation-based communication systems, including later technologies.

5G NR may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. 5G NR may support beamforming and beam direction to be dynamically configured. MIMO transmissions with precoding may also be supported. MIMO configurations in the DL may support multiple transmit antennas with multi-layer DL transmissions up to 8 streams per UE.

FIG. 1 illustrates an example wireless communication network 100 in which aspects of the present disclosure may be performed. For example, the wireless communication network 100 may be a 5G NR network. As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell" which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for precoder matrix quantization for compressed CSI reporting. As shown in FIG. 1, the UE 120a has CSI manager 122. The CSI manager 122 may be configured to receive, from the BS 110a, a CSI report configuration for frequency domain compressed precoder matrix feedback. The CSI report configuration configures the UE 120a to report, for a plurality of selected beams at a plurality of time domain taps, a frequency domain compression basis vector and a plurality of linear combination coefficients associated with the frequency domain compression. The CSI manager 122 may be configured to, for each of the beams, group the time domain taps into at least first and second groups each having zero, one, or greater than one time domain taps. For example, a first group may include all of the time domain taps and another group may include none of the time domain taps. The CSI manager 122 may be configured to quantize the corresponding linear combination coefficients and frequency domain compression basis vectors based on the grouping. The UE 120a reports the quantized linear combination coefficients and frequency domain compression basis vectors to the BS 110a. A strongest coefficient may not be quantized. As shown in FIG. 1, the BS 110a includes the CSI manager 112 that may be configured to perform corresponding operations to those performed by the CSI manager 122.

Figure 2:
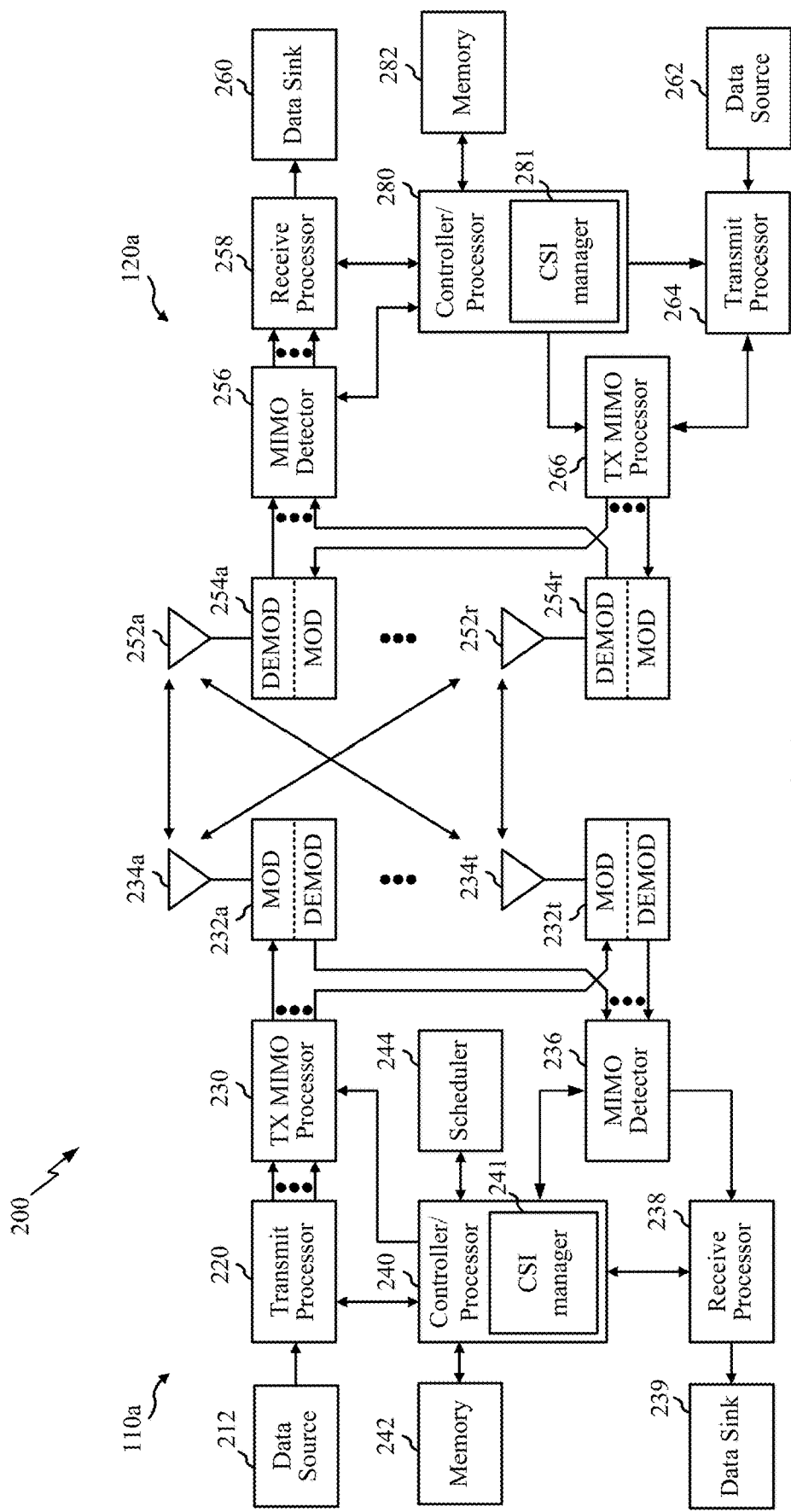
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure. For example, antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein for precoder matrix quantization for compressed CSI feedback.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120a, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 466 if applicable, further processed by the modulators in transceivers 254a through 254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The controllers/processors 240 and 280 may direct the operation at the BS 110a and the UE 120a, respectively. The processor 240 and/or other processors and modules at the BS 110a may perform or direct the execution of processes for the techniques described herein. The memories 242 and 282 may store data and program codes for BS 110a and UE 120a, respectively. A scheduler 244 may schedule UEs for data transmission on the downlink and/or uplink.

NR may utilize orthogonal frequency division multiplexing (OFDM) on the downlink and/or uplink and single-carrier frequency division multiplexing (SC-FDM) on the uplink and/or downlink. OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. For example, the spacing of the subcarriers (SCS) may be 15 kHz and other SCS may be defined with respect to the base SCS (e.g., 30 kHz, 60 kHz, 120 kHz, 240 kHz, etc.). The minimum resource allocation (e.g., a resource block (RB)) may be 12 consecutive subcarriers. The system bandwidth may also be partitioned into subbands that may cover multiple RBs.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Figure 3:
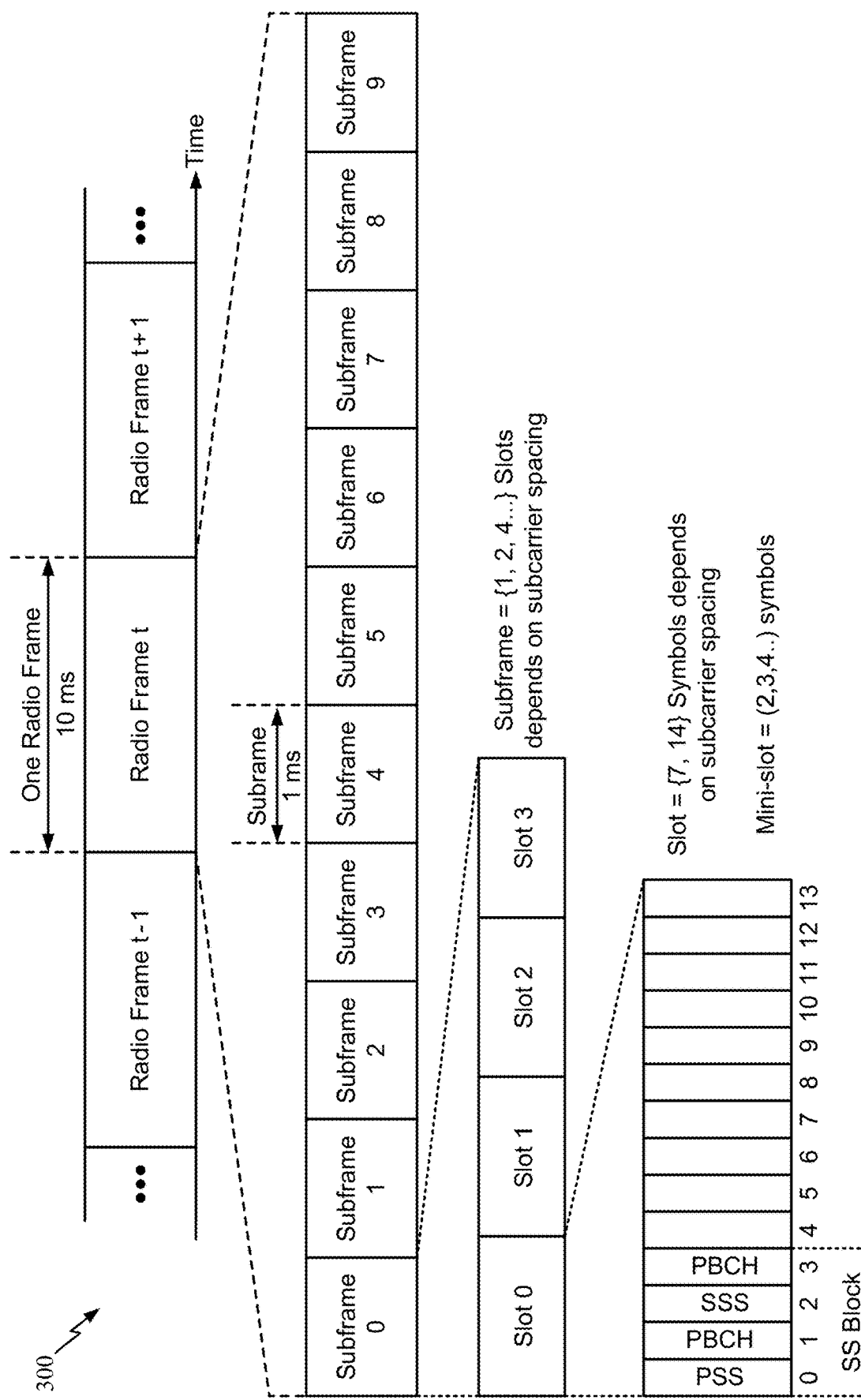
FIG. 3 illustrates an example of a frame format for a new radio (NR) system, in accordance with certain aspects of the present disclosure.

In NR, a subframe is 1 ms, but the basic TTI is referred to as a slot. FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

CSI may refer to channel properties of a communication link. CSI may represent the combined effects of, for example, scattering, fading, and power decay with distance between a transmitter and receiver. Channel estimation using pilots, such as CSI-RS, may be performed to determine these effects on the channel. CSI may be used to adapt transmissions based on the current channel conditions, which is useful for achieving reliable communication, in particular, with high data rates in multi-antenna systems. CSI may be estimated at the receiver, quantized, and fed back to the transmitter. The CSI may include the channel quality indicator (CQI), precoding matrix indicator (PMI), CSI-RS resource indicator (CRI), SS/PBCH block resource indicator (SSBRI), layer indicator (LI), rank indicator (RI), and/or LI-RSRP.

The network (e.g., a BS), may configure UEs for CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

The CSI report configuration also configures the CSI parameters (sometimes referred to as quantities) to be reported. Three codebooks include Type I single panel, Type I multi-panel, and Type II single panel. Regardless which codebook is used, the CSI report may include the CQI, PMI, CRI, and/or RI. The structure of the PMI may vary based on the codebook. The CRI, RI, and CQI may be in a first part (Part I) and the PMI may be in a second part (Part II) of the CSI report. For the Type I single panel codebook, the PMI may consist of a W1 matrix (e.g., subset of beams) and a W2 matrix (e.g., phase for cross polarization combination and beam selection). For the Type I multi-panel codebook, compared to type I single panel codebook, the PMI further comprises a phase for cross panel combination. For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., report FreqConfiguration contained in a CSI-ReportConfig) which indicates a frequency granularity of the CSI report, where a subband may be defined as $N_{PRB}^{SB}$ contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

Figure 4:
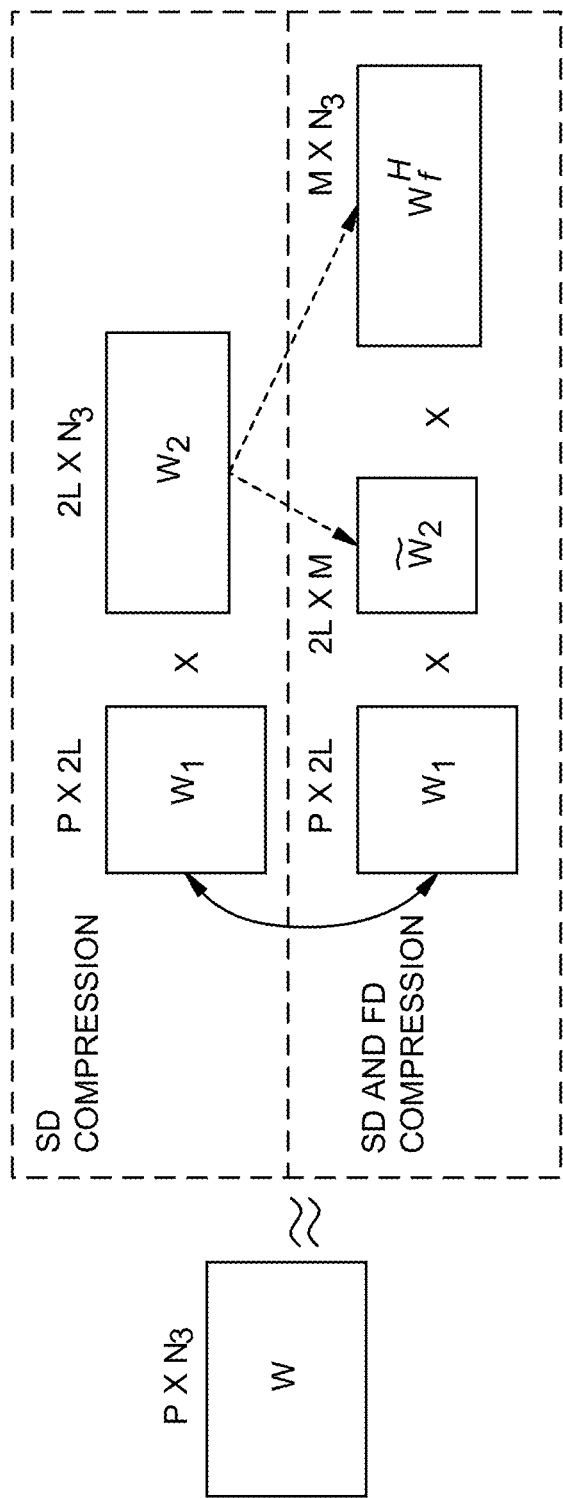
FIG. 4 is a block diagram showing example precoder matrix feedback without frequency domain compression and with frequency domain compression, in accordance with certain aspects of the present disclosure.

In certain systems (e.g., Release 15 5G NR), the UE may be configured to report compressed CSI feedback, to reduce overhead. For example, the UE may be configured to report at least a Type II precoder across configured frequency domain (FD) units. For example, as shown in FIG. 4, the precoder matrix W includes the $W_1$ matrix, reporting a subset of selected beams using spatial compression, and the $W_2$ matrix, reporting (for cross-polarization) the linear combination coefficients for the selected beams (2 L) across the configured FD units:

$$w_r = \sum_{i=0}^{2L-1} b_i \cdot c_i, \text{ where } c_i = [\underbrace{c_{i,0} \; \cdots \; c_{i,N_3-1}}_{N_3}],$$

where $b_i$ is the selected beam, $c_i$ is the set of linear combination coefficients, L is the number of selected spatial beams, and $N_3$ corresponds to the number of frequency units (e.g., subbands, RBs, etc.). The precoder is based on a linear combination of DFT beams. The Type II codebook may improve MU-MIMO performance. As shown in FIG. 4, the $W_2$ matrix has size 2 L×$N_3$.

In certain systems (e.g., Rel-16 5G NR), the UE may be configured to report frequency domain compressed precoder feedback to reduce overhead for the CSI report. As shown in FIG. 4, the precoder matrix with FD compression may use a FD compression matrix to compress the $W_2$ matrix size to 2 L×M, where M<$N_3$ as $W=W_1 \tilde{W}_2 W_f^H$, where the precoder matrix W has P=$2N_1N_2$ rows (spatial domain, number of ports) and $N_3$ columns (frequency-domain compression unit, consisting of RBs or reporting subbands). The $\tilde{W}_2$ matrix includes the linear combination coefficients (amplitude and co-phasing), where each element represents the coefficient of a tap for a beam. The $W_f^H$ matrix is composed of the basis vectors (each row is a basis vector) used to perform compression in frequency domain. In some examples, the basis vectors in $W_f$ are derived from a certain number of columns in a discrete Fourier transform (DFT) matrix. In the $\tilde{W}_2$ matrix, one row corresponds to one spatial beam in $W_1$, and one entry therein represents the coefficient of one tap for this spatial beam. An entry in $\tilde{W}_2$ corresponds to a row of $W_f^H$, (e.g., a column of $W_f$).

The precoder matrix may be given by:

$$w_r = \sum_{i=0}^{2L-1} b_i \cdot \tilde{c}_i \cdot F_i^H,$$

where the DFT compression basis is given by:

$$F_i^H = \begin{bmatrix} f_{i,0}^H \\ f_{i,1}^H \\ \vdots \\ f_{i,N_3-1}^H \end{bmatrix} \text{ of size } M_i \times N_3,$$

where $M_i$ is dimension of the compressed domain. The coefficients may be given by:

$$\tilde{c}_i = [\underbrace{\tilde{c}_{i,0} \; \cdots \; \tilde{c}_{i,M_i-1}}_{M_i}],$$

and the dimension of the compressed domain is $M_i$<$N_3$.

Figure 5:
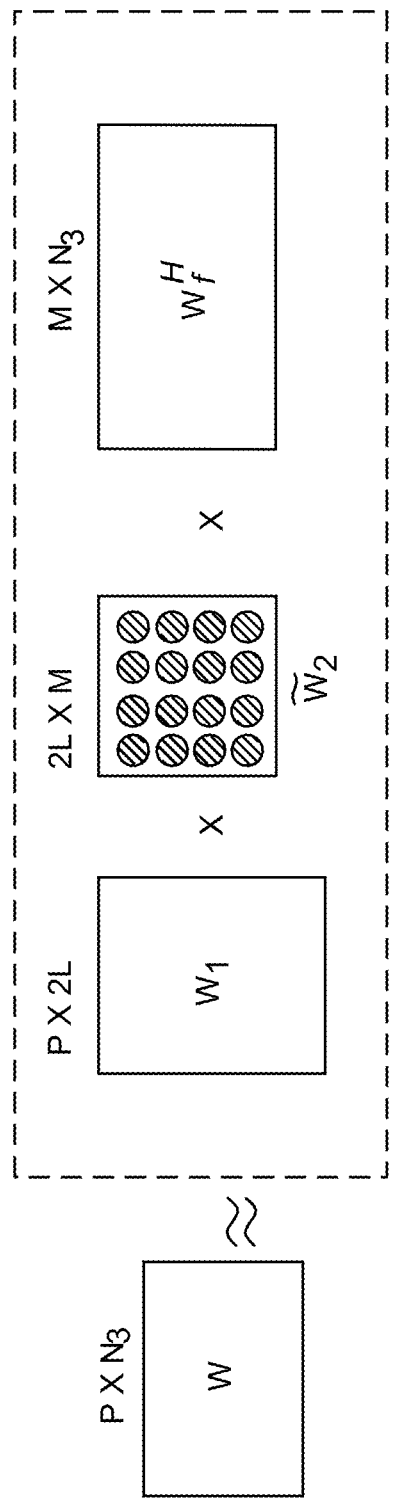
FIG. 5 is a block diagram showing example precoder matrix feedback with frequency domain compression for a single layer, in accordance with certain aspects of the present disclosure.
Figure 6:
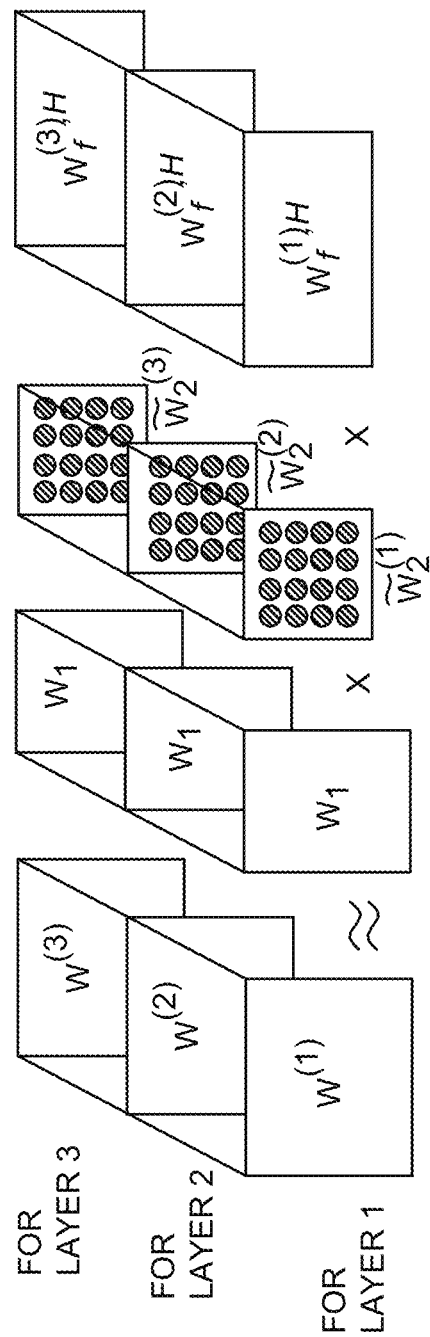
FIG. 6 is a block diagram showing example precoder matrix feedback with frequency domain compression for multiple layers, in accordance with certain aspects of the present disclosure.

In the linear combination codebook, the precoder of each layer is formed by a linear combination of a set of spatial beams. The linear combination coefficients are reported on the FD unit level and, therefore, the overhead scales with the number of FD units and the number of layers. FIG. 5 is a block diagram showing example precoder matrix feedback with frequency domain compression for a single layer and FIG. 6 is a block diagram showing example precoder matrix feedback with frequency domain compression for multiple layers or FDs. FIG. 7 is an example frequency domain compression matrix for CSI reporting.

As discussed above with respect to FIGS. 4-7, in certain systems (e.g., Rel-16 5G NR systems) a user equipment (UE) may be configured to report channel state information (CSI) feedback with Type-II codebook for frequency domain (FD) compressed precoder matrix indicator (PMI) feedback. The PMI feedback is composed of the beam selection in the matrix $W_1$, the amplitude and phase coefficient values of each entry in the matrix $\tilde{W}_2$ and the FD compression basis indication in the matrix $W_f$. As discussed above, CSI feedback with the Type-II codebook improves the accuracy of spatial domain beams by generating the spatial beams via the linear combination of the grid beams in the pre-defined codebook.

The quantization of the entries in $\tilde{W}_2$ and basis vectors in $W_f$ may impact the feedback overhead, the accuracy of the precoding matrix information, and the performance of single-user (SU) or multi-user (MU) multiple-input multiple-output (MIMO) transmission.

Example Precoder Matrix Quantization for Compressed CSI Feedback

Aspects of the present disclosure provide techniques and apparatus for precoder matrix feedback quantization for compressed channel state information (CSI) feedback. As discussed above, the compressed CSI may include linear combination coefficients associated with the compression. The linear combination coefficients may include amplitude coefficients and phase coefficients. The CSI feedback may also frequency domain compression basis vectors, which be associated with time domain taps and time delay values. The CSI feedback may be for multiple beams and layers.

According to certain aspects, the CSI feedback may be grouped and then quantized based on the groupings. In some examples, the CSI feedback may be grouped based on dominant coefficients and non-dominant coefficients. For example, for the coefficients of a spatial beam in the frequency domain, the dominant components may be the phase-shifted value of a number (e.g., one) of delayed taps, and may be referred to as dominant taps. Each of the dominant taps has a delay value (e.g., a time delay) and a complex coefficient including amplitude and phase. In some examples, a grouping may include the coefficients of the beams in a polarization that includes the strongest coefficients, and another grouping may include the coefficients of the beams in another polarization. In some examples, the amplitude values of these dominant taps have larger values than the amplitude of the other taps. However, the amplitude values of these dominant taps have large varying scope. Therefore, compared with the other taps, the quantization of these dominant taps may have greater impact on the accuracy of the precoding matrix quantization. In some examples, a group includes zero, one, or more than one taps. In some examples, the taps in one group may include all of the taps, and the number of taps in the other group may include zero taps. In some examples, the strongest coefficient is normalized to one and is therefore unnecessary to be reported and thus not quantized, another group is quantized with a first quantization, and yet another group is quantized with yet another quantization.

Figure 8:
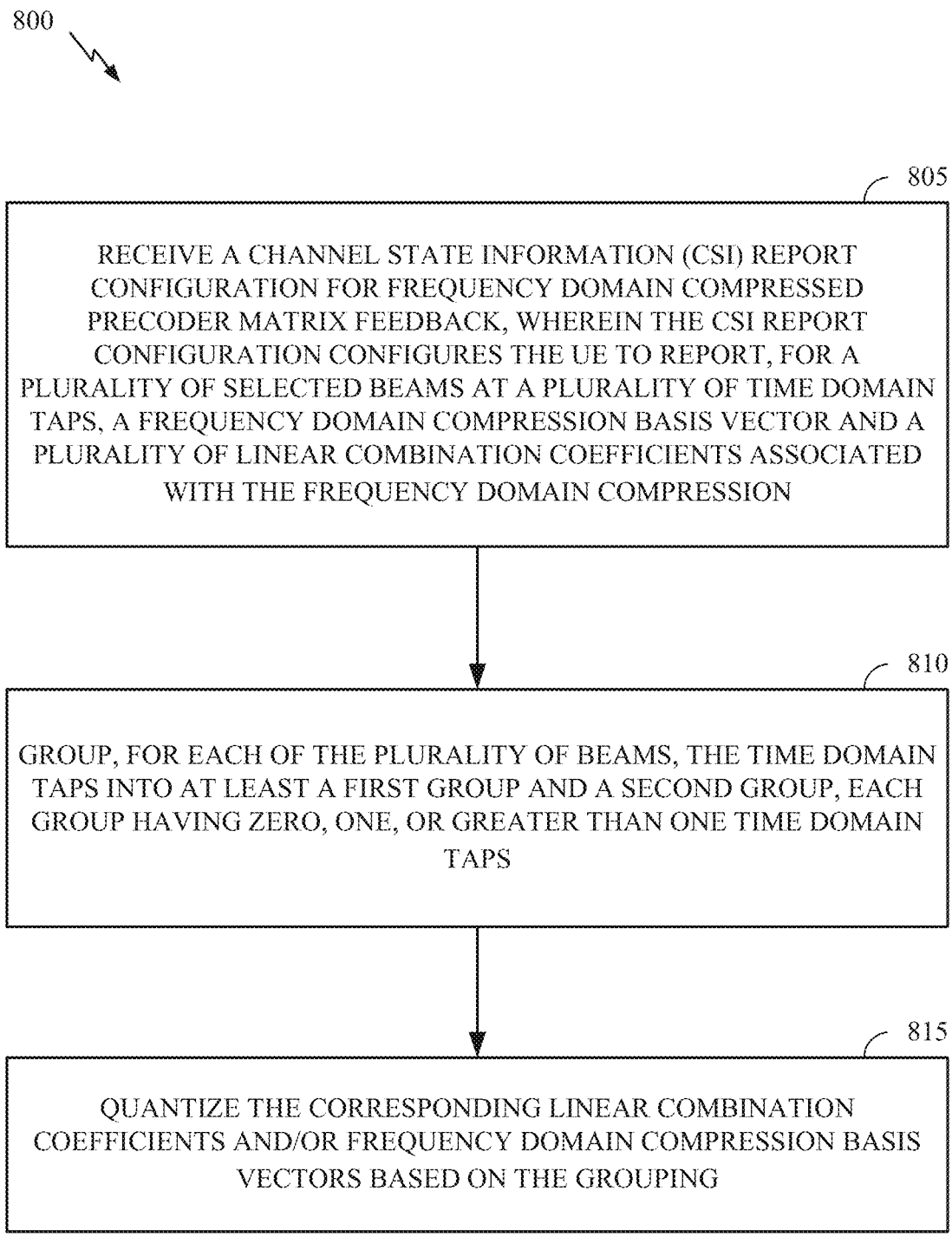
FIG. 8 is a flow diagram illustrating example operations by a UE for precoding matrix quantization for compressed CSI feedback, in accordance with certain aspects of the present disclosure.

FIG. 8 is a flow diagram illustrating example operations 800 for wireless communication, in accordance with certain aspects of the present disclosure. The operations 800 may be performed, for example, by UE (e.g., such as a UE 120a in the wireless communication network 100) for precoder matrix quantization for compressed CSI feedback. Operations 800 may be implemented as software components that are executed and run on one or more processors (e.g., processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 800 may begin, at 805, by receiving a CSI report configuration for frequency domain compressed precoder matrix feedback. The CSI report configuration configures the UE to report, for a plurality of selected beams (L) at a plurality of time domain taps (M), a frequency domain compression basis vector and a plurality of linear combination coefficients (e.g., complex amplitude and/or phase coefficients) associated with the frequency domain compression. Each time domain tap may be associated with a time delay value (t). In some examples, the UE receives an indication of FD units and/or layers for the CSI reporting, and reports the precoder matrix feedback for each of the indicated FD units and layers.

At 810, for each of the plurality of beams, the UE groups the time domain taps into at least a first group and a second group (e.g., for one row of the matrix $W_2$). Each group may include zero, one, or more than time domain taps. In some examples, the taps in one group may include all of the taps, and the number of taps in the other group may include zero taps. In some examples, the grouping is based on more dominant and less dominant linear combination coefficients, a target or threshold payload size, a target or threshold overhead, and/or threshold amplitude values. For example, the dominant taps, in a first grouping, may have the large value of amplitudes, and the other taps, in a second grouping, have small value of amplitudes.

At 815, the UE quantizes the corresponding linear combination coefficients and/or frequency domain compression basis vectors based on the grouping. The UE sends (e.g., reports) the quantized linear combination coefficients and/or frequency domain compression basis vectors for the first and second groups to a base station (BS) in one or more CSI reports.

Amplitude Quantization:

In some examples, the UE quantizes amplitudes (e.g., amplitude values or amplitude coefficients) of the linear combination coefficients in the first group (e.g., the dominant group) using a first number of bits ($n_1$), such as a pre-defined number of bits. For example, the UE may quantize each amplitude of the linear combination coefficients in the first group differentially using the first number of bits.

The UE may quantize a common value for amplitudes of all of the linear combination coefficients in the second group (e.g., the weaker or non-dominant group) with the second number of bits ($n_2$) and quantize a differential value for all of the linear combination coefficients in the second group with a third number of bits ($n_3$). Thus, the second group amplitude may be quantized with both a common quantization and a differential quantization. The UE can determine the common value based on a maximum, a sum power value, or an average of the amplitudes of the linear combination coefficients in the second group, or based on a given value.

In some examples, the amplitudes of all of the linear combination coefficients in the second group are normalized so that the common value is equal to one, which is unnecessary to be reported and thus not quantized.

In some examples, the quantized values of the amplitudes of the linear combination coefficients in the first group are equal (e.g., there is only one linear combination coefficient in the first group), and they are equal to the common value for amplitude quantization in the second group. In this case, the common value is unnecessary to be reported and thus not quantized.

In some examples, the amplitudes of the tap coefficients in group 1 may be denoted as $a_m$, m=1, ..., M. The amplitudes of the tap coefficients in group 2 may be denoted as $b_m$, m=1, ..., M'. The common value c is determined for all $b_m$, and then the differential value, denoted as $d_m$, is equal to $b_m/c$. Each $a_m$ is quantized with $n_1$ bits, c is quantized with $n_2$ bits, and each $d_m$ is quantized with $n_3$ bits. In some examples, the values of $n_1$, $n_2$ and $n_3$ satisfy $n_1 \cdot M' > n_2 + n_3 \cdot M'$. In some examples, c is equal to the maximum value of $\{b_m\}$, i.e. $c = \max(\{b_m\}_{m=1, \ldots, M'})$. In some examples, c is equal to the squared sum power value of $\{b_m\}$, i.e. $c = \sqrt{\sum_{m=1}^{M'} b_m^2}$. In some examples, c is equal to the average value of $\{b_m\}$, i.e.

$$c = \frac{1}{M'} \sum_{m=1}^{M'} b_m.$$

Figure 9:
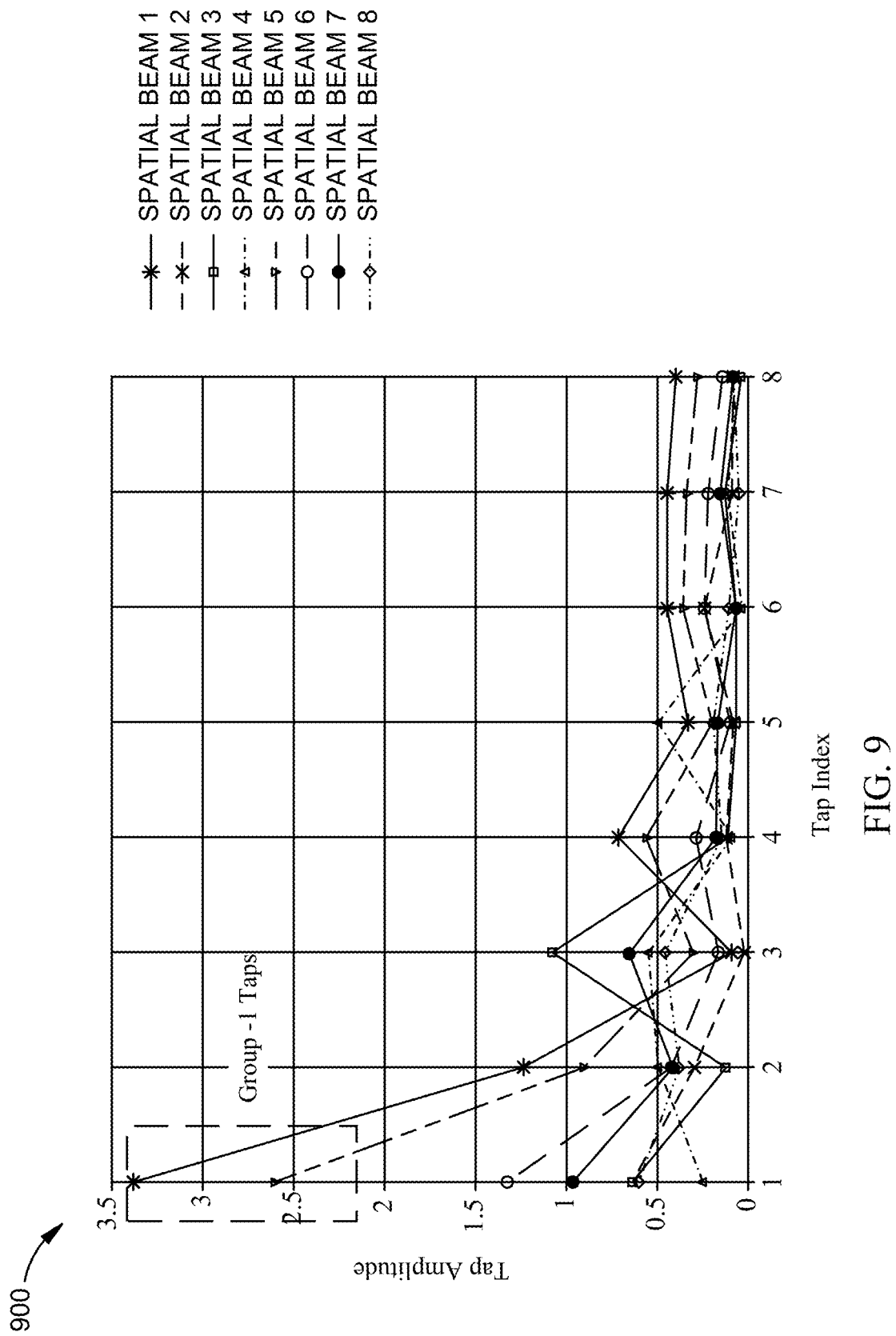
FIG. 9 is a graph showing coefficient amplitude distribution over multiple taps for all beams of a layer, in accordance with certain aspects of the present disclosure.

In a multiple beam scenario, the number of taps in group 1 or group 2 can be different among beams. For each layer, the UE can determine a number of dominant beams, whose taps are divided into two groups as discussed above. Then, the rest non-dominant beams have only group-2 taps. The group-2 taps in multiple or all the beams may be quantized collectively, such as by determining a cross-beam common amplitude value c. The cross-beam common amplitude quantization may be an amplitude quantization that is common for multiple beams. In some examples, the rest non-dominant beams are divided into multiple groups, and a different cross-beam common amplitude value is determined for each group. FIG. 9 is a graph 900 showing coefficient amplitude distribution over multiple taps for all beams of a layer, in accordance with certain aspects of the present disclosure. In the example in FIG. 9, the first tap in beam 1 and beam 5 are determined as group-1 taps, whose amplitudes are quantized independently, each with $n_1$ bits. The other taps are determined as group-2 taps, whose amplitudes are quantized jointly by a common value (with $n_2$ bits) and a number of individual differential values (each with $n_3$ bits).

In a multiple layer scenario, the number of taps in group 1 or group 2 can be different among layers. The differential amplitude value is calculated for each group-2 tap of multiple or all the beams for each layer. The group-2 taps in multiple or all the layers are quantized collectively, such as by determining a cross-layer common amplitude value c and then calculating the differential amplitude value for each group-2 tap of multiple or all the beams of multiple or all the layers.

Phase Quantization:

According to certain aspects, the UE quantizes phase values (e.g., phase coefficients) of the linear combination coefficients in the first group (e.g., the dominant group) using a first number of bits for a first resolution and the UE quantizes phase values of the linear combination coefficients in the second group using a second number of bits for a second resolution, not greater than the first resolution. In some examples, the phase coefficients are quantized with a same number of bits in both groups. Each group may include zero, one, or more than time domain taps. In some examples, the taps in one group may include all of the taps, and the number of taps in the other group may include zero taps. In some examples, the phase values of all the linear combination coefficients for a layer is normalized so that the phase value of one of the linear combination coefficients in the first group, such as the one with the largest amplitude value, is zero, which is unnecessary to be reported and thus not quantized, or so that the phase value of one of the linear combination coefficients in the second group, such as the one with the largest amplitude value, is zero, which is unnecessary to be reported and thus not quantized.

FD Basis Vector Quantization:

According to certain aspects, the UE may quantize the time delay values for each FD compression basis vector corresponding to the taps in the first group using a first number of bits for a first resolution. The UE may quantize time delay values for each FD compression basis vector corresponding to the taps in the second group using a second number of bits for a second resolution, not greater than the first resolution. In some examples, the delay values for the first group are quantized with an over-sampling timing coefficient. In some examples, the delay values for the second group are quantized with a normal-sampling timing coefficient.

In some examples, one frequency-domain basis vector in $W_f$ corresponding to a tap in $\tilde{W}_2$ can be written as $$\tilde{e}_m = \frac{1}{\sqrt{N_{SB}}} \left[1, e^{\frac{-j2\pi\tau_m}{N_{SB}}}, e^{\frac{-j2\pi 2\tau_m}{N_{SB}}}, \ldots, e^{\frac{-j2\pi(N_{SB}-1)\tau_m}{N_{SB}}}\right]^T$$

where $N_{SB}$ is the number of subbands, and $\tau_m$ is the normalized delay value. The quantization of this basis vector is to quantize the value of $\tau_m$. According to certain aspects, $\tau_m$ is quantized with higher resolution for the group-1 taps, $m=1, \ldots, M$, while $\tau_{m'}$ is quantized with a not higher resolution for the group-2 taps, $m'=1, \ldots, M'$. For example, $\tau_m$ may be equal to an over-sampling timing coefficient, such as:

$$\tau_m \in, O_3 > 1,$$

for the group-1 taps. $\tau_m$ may be equal to a normal-sampling timing coefficient, such as:

$$\tau_m \in \{0, \ldots, N_{SB} - 1\},$$

for the group-2 taps.

In some examples, the UE may first calculate the low-resolution values for all the basis vectors, and then choose those with large values of tap coefficient amplitude to further calculate their high-resolution values.

According to certain aspects, any of the quantization techniques described above for amplitude, phase, and/or FD basis vector quantization may be used individually, or in any combination.

According to certain aspects, the compressed CSI feedback quantization techniques described herein may provide benefits. For example, compared with quantization of each tap amplitude independently or quantizing each tap amplitude in differentiated way, the techniques may allow PMI accuracy enhancement from the independent quantization of the group-1 taps and feedback overhead reduction from the differential quantization of group-2 taps. In addition, compared with quantization of frequency-domain basis vectors all with high resolution or all with low resolution, the proposed techniques allow PMI accuracy enhancement from the high resolution quantization of basis vectors for group-1 taps and feedback overhead reduction from the low quantization of basis vectors for group-2 taps.

Figure 10:
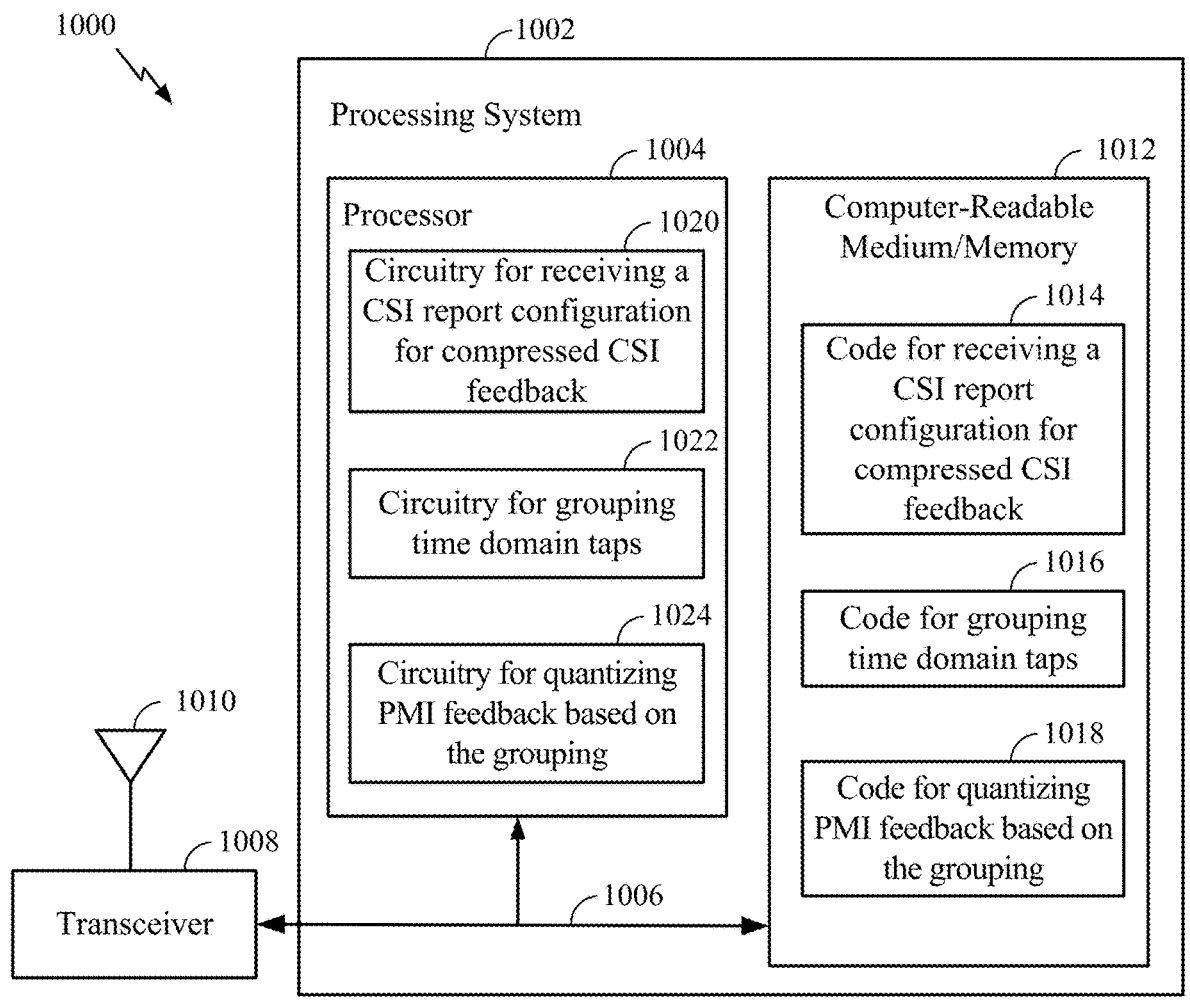
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for quantization for compressed CSI feedback. In certain aspects, computer-readable medium/memory 1012 stores code 1014 for receiving CSI report configuration for compressed CSI feedback; code 1016 for grouping time domain taps; and code 1018 for quantizing PMI feedback based on the grouping. In certain aspects, the processor 1004 has circuitry configured to implement the code stored in the computer-readable medium/memory 1012. The processor 1004 includes circuitry 1020 for receiving CSI report configuration for compressed CSI feedback; circuitry 1022 for grouping time domain taps; and circuitry 1024 for quantizing PMI feedback based on the grouping.

Example Aspects

In a first aspect, a method for wireless communications by a user equipment (UE) includes receiving a channel state information (CSI) report configuration for frequency domain compressed precoder matrix feedback. The CSI report configuration configures the UE to report, for a plurality of selected beams at a plurality of time domain taps, a frequency domain compression basis vector and a plurality of linear combination coefficients associated with the frequency domain compression. For each of the plurality of beams, the UE groups the time domain taps into at least a first group and a second group. A number of time domain taps in each group is zero, one, or greater than one. The UE quantizes the corresponding linear combination coefficients and/or the frequency domain compression basis vectors based on the grouping.

In a second aspect, in combination with the first aspect, the linear combination coefficients include amplitude coefficients and/or phase coefficients.

In a third aspect, in combination with one or more of the first and second aspects, quantizing the linear combination coefficients based on the grouping includes quantizing the amplitude coefficients in the first group using a first number of bits and quantizing the amplitude coefficients in the second group differentially using a second number of bits.

In a fourth aspect, in combination with one or more of the first through third aspects, quantizing the amplitude coefficients in the first group includes quantizing each amplitude coefficient in the first group individually using a first number of bits.

In a fifth aspect, in combination with one or more of the first through fourth aspects, the differential quantization for the second group includes quantizing a common value for all of the amplitude coefficients in the second group with the second number of bits and quantizing a differential value for all of the amplitude coefficients in the second group with a third number of bits.

In a sixth aspect, in combination with one or more of the first through fifth aspects, the common value is the same for multiple of the plurality of beams.

In a seventh aspect, in combination with one or more of the first through sixth aspects, the UE determines the common value based on a maximum, a sum power value, or an average of the amplitudes of the linear combination coefficients in the second group or based on a given value.

In an eighth aspect, in combination with one or more of the first through seventh aspects, quantizing the linear combination coefficients based on the grouping includes quantizing the phase coefficients in the first group using a first number of bits for a first resolution and quantizing the phase coefficients in the second group using a second number of bits for a second resolution not higher than the first resolution.

In a ninth aspect, in combination with one or more of the first through eighth aspects, each time domain tap is associated with a time delay value.

In a tenth aspect, in combination with one or more of the first through ninth aspects, quantizing the linear combination coefficients based on the grouping includes quantizing the time delay values for each frequency domain compression basis vector corresponding to the time domain taps in the first group using a first number of bits for a first resolution and quantizing the time delay values for each frequency domain compression basis vector corresponding to the taps in the second group using a second number of bits for a second resolution not higher than the first resolution.

In an eleventh aspect, in combination with one or more of the first through tenth aspects, the delay values for the first group are quantized with an over-sampling timing coefficient and the delay values for the second group are quantized with a normal-sampling timing coefficient.

In a twelfth aspect, in combination with one or more of the first through eleventh aspects, the grouping is based on at least one of: more dominant and less dominant linear combination coefficients, target or threshold payload size, target or threshold overhead, or threshold amplitude values.

In a thirteenth aspect, in combination with one or more of the first through twelfth aspects, the UE receives an indication of at least one of: frequency domain units or layers for the CSI reporting. The precoder matrix feedback is provided for each of the indicated FD units and layers.

In a fourteenth aspect, in combination with one or more of the first through thirteenth aspects, the UE sends the quantized linear combination coefficients and frequency domain compression basis vectors for the first and second groups to a base station (BS) in one or more CSI reports.

In a fifteenth aspect, in combination with one or more of the first through fourteenth aspects, the grouping includes grouping all of the time domain taps into a first grouping and grouping zero of the time domain taps into a second group.

In a sixteenth aspect, in combination with one or more of the first through fifteenth aspects, a strongest linear combination coefficient is not quantized.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.).

A BS or DU may communicate with a set of UEs on downlink channels (e.g., for transmissions from a BS or DU to a UE) and uplink channels (e.g., for transmissions from a UE to BS or DU). The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), the method comprising:
   receiving a channel state information (CSI) report configuration for frequency domain compressed precoder matrix feedback, wherein the CSI report configuration configures the UE to report, for a plurality of selected beams at a plurality of time domain taps, a frequency domain compression basis vector and a plurality of linear combination coefficients associated with the frequency domain compression, wherein the linear combination coefficients comprise amplitude coefficients;
   for each of the plurality of beams, grouping the time domain taps into at least a first group and a second group, wherein a number of time domain taps in each group is zero, one, or greater than one; and
   quantizing at least one of: the corresponding linear combination coefficients or the frequency domain compression basis vectors based on the grouping, comprising quantizing the amplitude coefficients in the first group individually using a first number of bits and quantizing the amplitude coefficients in the second group by quantizing a common value for all of the amplitude coefficients in the second group with the second number of bits, and quantizing a differential value for all of the amplitude coefficients in the second group with a third number of bits.

2. The method of claim 1, wherein the common value is the same for multiple of the plurality of beams.

3. The method of claim 1, further comprising determining the common value based on a maximum, a sum power value, or an average of the amplitudes of the linear combination coefficients in the second group or based on a given value.

4. The method of claim 1, wherein the linear combination coefficients further comprises phase coefficients.

5. The method of claim 4, wherein quantizing the linear combination coefficients based on the grouping comprises:
   quantizing the phase coefficients in the first group using a first number of bits for a first resolution; and
   quantizing the phase coefficients in the second group using a second number of bits for a second resolution not higher than the first resolution.

6. The method of claim 1, wherein each time domain tap is associated with a time delay value.

7. The method of claim 6, wherein quantizing the linear combination coefficients based on the grouping comprises:
   quantizing the time delay values for each frequency domain compression basis vector corresponding to the time domain taps in the first group using a first number of bits for a first resolution; and
   quantizing the time delay values for each frequency domain compression basis vector corresponding to the taps in the second group using a second number of bits for a second resolution not higher than the first resolution.

8. The method of claim 7, wherein:
   the delay values for the first group are quantized with an over-sampling timing coefficient; and
   the delay values for the second group are quantized with a normal-sampling timing coefficient.

9. The method of claim 1, wherein the grouping is based on at least one of: more dominant and less dominant linear combination coefficients, target or threshold payload size, target or threshold overhead, or threshold amplitude values.

10. The method of claim 1, further comprising sending the quantized linear combination coefficients and frequency domain compression basis vectors for the first and second groups to a base station (BS) in one or more CSI reports.

11. An apparatus for wireless communication, the apparatus comprising:
   a memory; and
   at least one processor coupled with the memory and configured to cause the apparatus to:
      receive a channel state information (CSI) report configuration for frequency domain compressed precoder matrix feedback, wherein the CSI report configuration configures the apparatus to report, for a plurality of selected beams at a plurality of time domain taps, a frequency domain compression basis vector and a plurality of linear combination coefficients associated with the frequency domain compression, wherein the linear combination coefficients comprise amplitude coefficients;
      for each of the plurality of beams, group the time domain taps into at least a first group and a second group, wherein a number of time domain taps in each group is zero, one, or greater than one; and
      quantize at least one of: the corresponding linear combination coefficients or the frequency domain compression basis vectors based on the grouping, comprising quantizing the amplitude coefficients in the first group individually using a first number of bits and quantizing the amplitude coefficients in the second group by quantizing a common value for all of the amplitude coefficients in the second group with the second number of bits, and quantizing a differential value for all of the amplitude coefficients in the second group with a third number of bits.

12. The apparatus of claim 11, wherein the common value is the same for multiple of the plurality of beams.

13. The apparatus of claim 11, wherein the at least one processor is configured to cause the apparatus further to determine the common value based on a maximum, a sum power value, or an average of the amplitudes of the linear combination coefficients in the second group or based on a given value.

14. The apparatus of claim 11, wherein the linear combination coefficients further comprises phase coefficients.

15. The apparatus of claim 14, wherein the at least one processor is configured to cause the apparatus to:
   quantize the phase coefficients in the first group using a first number of bits for a first resolution; and
   quantize the phase coefficients in the second group using a second number of bits for a second resolution not higher than the first resolution.

16. The apparatus of claim 11, wherein each time domain tap is associated with a time delay value.

17. The apparatus of claim 16, wherein the at least one processor is configured to cause the apparatus to:
   quantize the time delay values for each frequency domain compression basis vector corresponding to the time domain taps in the first group using a first number of bits for a first resolution; and
   quantize the time delay values for each frequency domain compression basis vector corresponding to the taps in the second group using a second number of bits for a second resolution not higher than the first resolution.

18. The apparatus of claim 17, wherein:
   the delay values for the first group are quantized with an over-sampling timing coefficient; and
   the delay values for the second group are quantized with a normal-sampling timing coefficient.

19. The apparatus of claim 11, wherein the grouping is based on at least one of:
more dominant and less dominant linear combination coefficients, target or threshold payload size, target or threshold overhead, or threshold amplitude values.

20. An apparatus for wireless communications, the apparatus comprising:
means for receiving a channel state information (CSI) report configuration for frequency domain compressed precoder matrix feedback, wherein the CSI report configuration configures the apparatus to report, for a plurality of selected beams at a plurality of time domain taps, a frequency domain compression basis vector and a plurality of linear combination coefficients associated with the frequency domain compression, wherein the linear combination coefficients comprise amplitude coefficients;
means for, for each of the plurality of beams, grouping the time domain taps into at least a first group and a second group, wherein a number of time domain taps in each group is zero, one, or greater than one; and
means for quantizing at least one of: the corresponding linear combination coefficients or the frequency domain compression basis vectors based on the grouping, comprising quantizing the amplitude coefficients in the first group individually using a first number of bits and quantizing the amplitude coefficients in the second group by quantizing a common value for all of the amplitude coefficients in the second group with the second number of bits, and quantizing a differential value for all of the amplitude coefficients in the second group with a third number of bits.

* * * * *